INVENTOR
Charles B. Bisbee
BY Eldon H. Luther
ATTORNEY

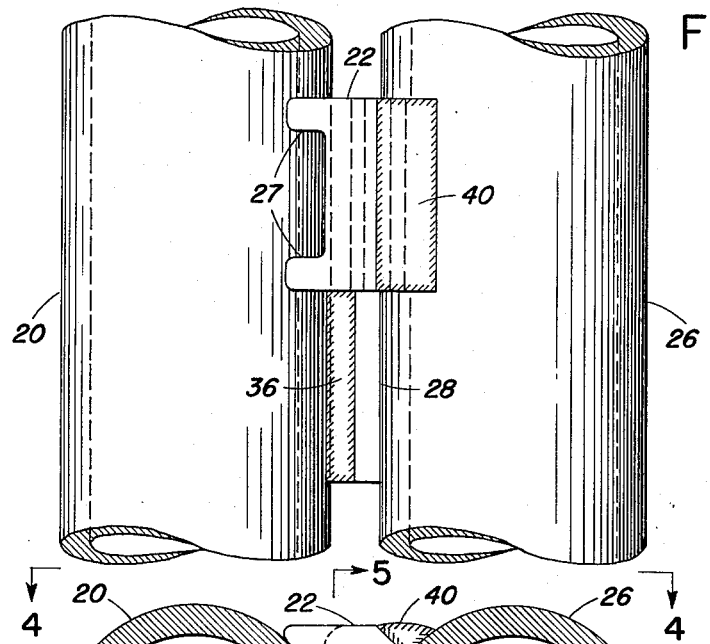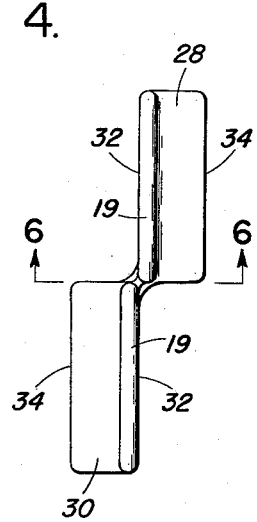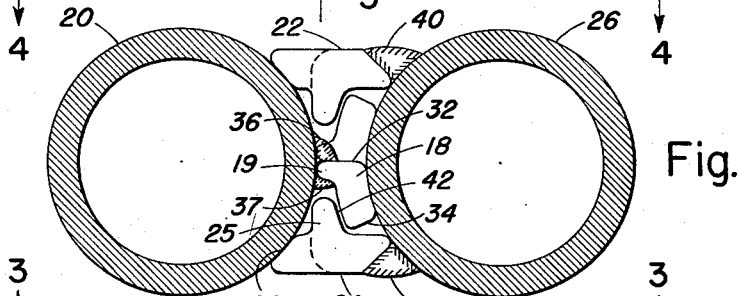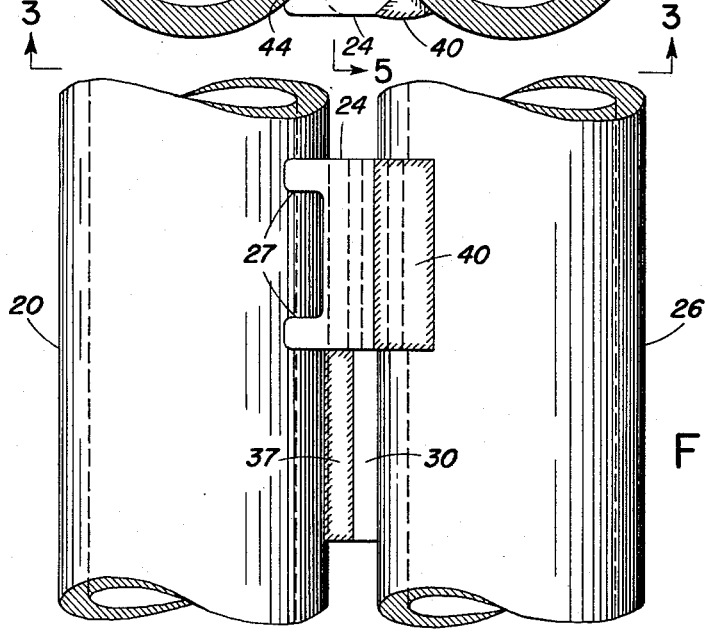

United States Patent Office 2,997,069
Patented Aug. 22, 1961

2,997,069
SPACER AND GUIDE ASSEMBLY FOR
SUPERHEATER AND THE LIKE
Charles B. Bisbee, Highland, Ind., assignor to Combustion Engineering, Inc., New York, N.Y., a corporation of Delaware
Filed June 17, 1959, Ser. No. 820,991
3 Claims. (Cl. 138—114)

This invention relates generally to a spacer and guide assembly or mechanism for maintaining the tubes of a superheater or similar heat exchanger organization in alignment and in properly spaced relation with the invention having particular relation to pendent or vertically disposed tubes and being effective to align and space these tubes as aforementioned while permitting relative vertical movement therebetween.

Spacing and aligning devices for vertically disposed superheater tubes and the like have been employed in the steam generating and allied fields for a long time, since there are many instances where it is necessary to maintain adjacent tubes in a predetermined spaced relation and in alignment while permitting the tubes to move axially with relation to each other. However, these prior art organizations have had one or more difficiencies being either relatively complicated, cumbersome, costly or unreliable in operation. The organization of the present invention is an improved arrangement for aligning and spacing vertically disposed tubes, such as found in a pendent superheater, and which is simple in construction and effective in its operation with this aligning and spacing device permitting production welding to reduce the assembling cost of the device and with the device being organized so that a minimum amount of metal is exposed to the hot gases that surround the tubes and with the device also being in intimate contact and relation with the tubes all of which maintains the temperature of the elements of the assembly relatively low and prevents deterioration or burning thereof. Furthermore, the assembly is organized so that the stresses therein are maintained low and so that the connecting welds will not be overstressed and rupture. A further advantage of the organization of the invention is that limited differential movement between portions of the alignment and spacer assembly and the tube to which these portions are connected may be had so that creep of the tubes relative to these portions of the assembly will not precipitate the failure of the connecting welding.

In accordance with the invention the alignment and spacer assembly includes a male member in the form of an arcuate plate and a pair of female members between which this male member is slidably held. The arcuate plate is welded to one of the tubes with which the assembly is associated with the arc of the plate conforming to that of the other tube being in sliding engagement with the exterior of this other tube. The plate has upper and lower laterally or arcuately offset portions so that the outwardly extending or outer wedge of these portions is spaced from the tube to which the plate is connected while the other edge is adjacent to this tube, being close to the line of contact of the plate with the tube and with this other edge being welded to the tube. The female members are of angular or modified T configuration with one of these members extending from the tube which nests within the arcuate configuration of the plate and being welded to this tube and extending behind the laterally extending portion of the plate at each side thereof. These angular members have their ends formed to conform with the outer circumference of the tube to which the plate is connected with the angular members being in sliding engagement with the outer portion of this tube and with the back or the convex portion of the arcuate plate. With this arrangement the two tubes are accurately maintained in alignment and in relatively closed spaced relation while being permitted to move relative to each other in an axial direction.

It is an object of this invention to provide an improved spacing and alignment assembly for closely spaced vertically disposed tubes and which permits the tubes to move vertically relative to each other while maintaining the same in predetermined space relation and in alignment.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 2 is a detailed view of the spacer and alignment assembly of the present invention and is taken generally on line 2—2 of FIG. 1, with this FIG. 2 disclosing only two tubes;

FIG. 3 is a fragmentary horizontal view taken generally from line 3—3 of FIG. 2;

FIG. 4 is a view similar to that of FIG. 3 but showing the other side of the assembly and is taken generally from line 4—4 of FIG. 2;

FIG. 5 is a detailed view of the male plate member of the assembly taken generally from line 5—5 of FIG. 2;

FIG. 6 is a sectional view taken along line 6—6 of FIG. 5 showing the interconnection of the upper and lower portions of the plate member.

Figure 1:
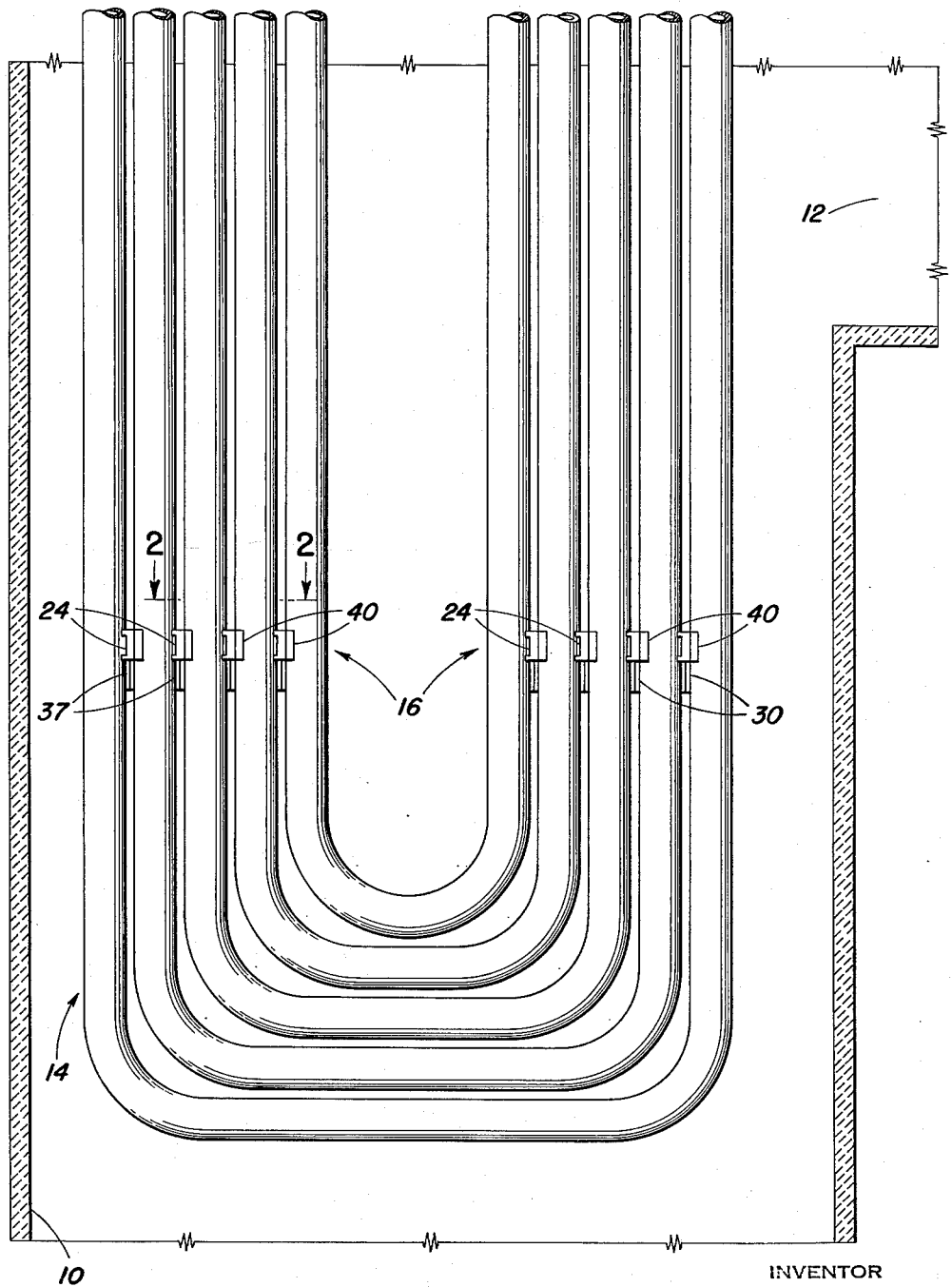
FIG. 1 is a fragmentary view in the nature of a vertical section through the upper portion of a furnace of a steam generator showing the disposition of a pendent superheater therein.

Referring now to the drawing, wherein like reference numerals are used throughout to designate like elements, there is depicted in FIG. 1 the furnace 10 of a steam generator into which fuel and air are introduced with the fuel being burned therewithin and the combustion gases thus produced rising upwardly through and passing the outlet 12. Extending downwardly into the upper end of the furnace is pendent superheater 14 which is comprised of a large number of tubular panels one of which is shown in FIG. 1 and with each of these panels being made up of closely spaced side by side tubes that extend down into the furnace and are reversely bent and then extend back up and out the roof of the furance. The distance that these tubes extend into the furance is relatively long and it is therefore necessary to provide spacer and guide means at one or more vertically spaced locations, such as the location identified as 16, in order to maintain the tubes in properly spaced relation and in alignment, with the tubes in each panel being maintained in a common plane.

The spacer and alignment assembly of this invention which is employed at this location 16 and which is shown in detail in FIGS. 2 through 6 includes male plate member 18 secured to tube 20 and received between the arms or female members 22 and 24 that extend from and are connected to tube 26. As best shown in FIG. 5, plate member 18 is comprised of an upper portion 28 and a lower portion 30 and this plate member is arcuately formed so that it conforms to the exterior of tube 26 with the upper and lower portions being laterally or arcuately offset as shown and with each portion having a ridge 19 that engages tube 20. With this construction the vertical edge 32 of each of these portions of plate 18 lies adjacent the exterior of tube 20 being close to the line of contact of this tube with the plate while the vertical edge 34 of each of these portions of the plate are well spaced from the wall of tube 20. Tubes 20 and 26 are in closely spaced relation and the thickness of plate 18 is such that the plate is snugly received between the tubes with the plate portions 28 and 30 connected with the tubes 20 by the welds 36 and 37 respectively, which joins the edges 32 of said upper and lower portions with the tube 20. The engagement of plate 18 with tube 26 is a sliding contact but since the plate conforms to the exterior of tube 26 it is relatively in good heat exchange relation with the tube.

The two tubes are maintained in their predetermined spaced relation and in alignment by means of the female members or arms 22 and 24 which extend from tube 26 and are slidably received behind the plate 18. Each of these arms is of the configuration as shown in FIGS. 2 and 3 and is connected to tube 26 by the welds 40. Arm 24 has an angular disposed portion 25 that extends behind the upper portion 28 of plate 18 with the inner surface 42 conforming with the outer surface of the plate and the arm is also provided at its upper and lower ends with extensions or projections 27 the inner end 44 of which conforms with the exterior of tube 20 but with the arm being in sliding engagement with both the plate 18 and the tube 20. Arm 22 is similarly arranged but is received behind the lower portion 30.

With this arrangement tubes 20 and 26 may move axially or vertically with respect to each other but are maintained in accurate alignment and in their predetermined spaced relation. Since the elements of the spacer and alignment assembly are in the relatively good heat exchange relation with both of the tubes their temperatures will be maintained low tending to prevent deterioration of the elements by the hot combustion gases that may surround the same. Furthermore the assembly is arranged so that the tubes may be disposed in closely spaced relation and the dimensions of the elements of the assembly may be maintained at a minimum with there being no relatively long elements which provide a large lever arm through which a force may be applied to the elements to tend to break their welded connections.

The upper and lower portions 28 and 30 of plate 18 have a reduced cross section at their connection as shown in FIG. 6 the purpose of which is to prevent fracturing of the welds 36 as a result of a creep of the tube or other limited differential movement between plate 18 and tube 20 with the plate being free of the location of the reduced cross section. The tube metal to which the plate member is connected is subject to growth and slow or long time creep and so will move relative to the plate a small amount. The reduced cross section interconnecting the upper and lower portions of the plate provides an area of low stress capacity so that if this creep of the tubes becomes of such magnitude as to develop large stresses, these stresses will cause this low cross section area to rupture thereby preventing the building up of stresses at the welded connection (36 and 37) of the plate to a point which would cause rupture of the weld connection. In other words, this low cross section area amounts to a safety feature and when stresses become excessive it will relative these stresses by rupture. The reason that the plate is made in this manner with the area of low cross section rather than having the upper and lower plate portions entirely separate initially is for ease of handling and fabrication. With the plate is one piece it is much easier to properly position and weld this male plate section of the connector assembly than if two independent portions were provided and had to be independently positioned and connected.

Accordingly, it will be seen that with the present invention there is provided an improved spacer and alignment assembly which is simple in construction and yet effective in its operation.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In combination a pair of closely spaced vertically disposed tubes, a spacer and guide assembly interconnecting said tubes and operative to maintain them in alignment while permitting relative axial movement therebetween, said assembly including an arcuate plate male member disposed between the tubes and of a thickness equal to the spacing of the tubes, said plate member being welded to one of the tubes and having an arc such that it conforms to and is juxtaposed to the other of the tubes with the plate member having upper and lower portions arcuately offset oppositely such that one vertical edge of each portion is spaced from said one tube while the other vertical edge is adjacent thereto and connected thereto by welding, a pair of angular female members welded to said other tube with one end extending around the spaced edge of each portion of the plate and gripping the back of the plate to provide a sliding connection therebetween with the ends of these angular members conforming to and juxtaposed to the wall of said one tube.

2. The organization of claim 1 where said end of the female members that conform to and are juxtaposed to the wall of said one tube are in the form of projections extending from the upper and lower portions of these members.

3. In combination a pair of closely spaced vertically disposed tubes, a spacer and guide assembly interconnecting said tubes and operative to maintain them in alignment while permitting relative axial movement therebetween, said assembly including an arcuate plate male member disposed between the tubes and of a thickness equal to the spacing of the tubes, said plate member being welded to one of the tubes and having an arc such that it conforms to and is juxtaposed to the other of the tubes with the plate member having upper and lower portions arcuately offset oppositely such that one vertical edge of each portion is spaced from said one tube while the other vertical edge is adjacent thereto and connected thereto by welding, said upper and lower portions being interconnected by a plate portion of reduced thickness relative to the remainder of the plate member and being free of said one tube at the location of the reduced cross section, a pair of angular female members welded to said other tube with a portion extending around the spaced edge of each portion of the plate gripping the back of the plate to provide a sliding connection therebetween with the ends of these angular members conforming to and juxtaposed to the wall of said one tube.

References Cited in the file of this patent
UNITED STATES PATENTS

| | | |
|---|---|---|
| 1,941,258 | Gordon | Dec. 16, 1933 |
| 2,006,200 | Harpster | June 25, 1935 |
| 2,561,540 | Sherbrooke | July 24, 1951 |